(12) United States Patent
Kuroi et al.

(10) Patent No.: US 9,876,998 B2
(45) Date of Patent: Jan. 23, 2018

(54) LIGHT SOURCE APPARATUS AND PROJECTOR

(71) Applicant: SEIKO EPSON CORPORATION, Tokyo (JP)

(72) Inventors: Kiyoshi Kuroi, Nagahama (JP); Akira Egawa, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/040,145

(22) Filed: Feb. 10, 2016

(65) Prior Publication Data
US 2016/0241821 A1 Aug. 18, 2016

(30) Foreign Application Priority Data
Feb. 17, 2015 (JP) .................. 2015-028781

(51) Int. Cl.
G03B 21/20 (2006.01)
H04N 9/31 (2006.01)
G02B 26/00 (2006.01)
G02B 27/09 (2006.01)
G02B 27/10 (2006.01)
G03B 21/22 (2006.01)

(52) U.S. Cl.
CPC ......... *H04N 9/3111* (2013.01); *G02B 26/008* (2013.01); *G02B 27/0966* (2013.01); *G02B 27/1046* (2013.01); *G03B 21/204* (2013.01); *H04N 9/317* (2013.01); *G03B 21/206* (2013.01); *G03B 21/208* (2013.01); *G03B 21/22* (2013.01)

(58) Field of Classification Search
CPC .. G03B 21/204; G03B 21/206; G03B 21/208; G03B 21/20; G03B 21/22; G03B 21/145; H04N 9/317; H04N 9/3111
See application file for complete search history.

(56) References Cited

U.S. PATENT DOCUMENTS 8,231,227 B2 7/2012 Kurosaki
8,820,940 B2 9/2014 Kita

FOREIGN PATENT DOCUMENTS

| JP | 2004-341105 A | 12/2004 |
|----|---------------|---------|
| JP | 2010-217566 A | 9/2010 |
| JP | 2012-004009 A | 1/2012 |
| JP | 2012-220811 A | 11/2012 |
| JP | 2012-221820 A | 11/2012 |
| JP | 2013-004231 A | 1/2013 |
| JP | 2013-025249 A | 2/2013 |
| JP | 2013-072942 A | 4/2013 |
| JP | 2013-080578 A | 5/2013 |
| JP | 2013-190674 A | 9/2013 |

*Primary Examiner* — Ryan Howard
(74) *Attorney, Agent, or Firm* — Oliff PLC

(57) ABSTRACT

A light source apparatus includes a light source, a substrate provided rotatably around a predetermined axis of rotation, a scattered light generator which is provided on the substrate and on which light from the light source is incident, a pickup lens provided on the light exiting side of the scattered light generator, and a holding member that holds the pickup lens, and at least one of the contour of a surface closest to the substrate among the surfaces of the holding member and the contour of a surface facing the substrate among the surfaces of the pickup lens is located inside the contour of the substrate when viewed in the direction parallel to the axis of rotation.

10 Claims, 6 Drawing Sheets

LIGHT SOURCE APPARATUS AND PROJECTOR

BACKGROUND

1. Technical Field

The present invention relates to a light source apparatus and a projector.

2. Related Art

A laser light source has been receiving attention as a light source for a projector. For example, JP-A-2012-4009 discloses a light source apparatus including a phosphor wheel having a rotating substrate on which a phosphor is placed and an excitation light source that excites the phosphor. In the light source apparatus, a pickup lens for capturing illumination light containing fluorescence is disposed in the vicinity of the phosphor wheel.

When the phosphor wheel rotates, turbulence occurs in the vicinity of the edge of the rotating substrate and the turbulence produces noise. The noise is hereinafter referred to as wind noise. In the related art described above, since the pickup lens is disposed in a region where the turbulence occurs, the pickup lens enhances the turbulence, that is, the wind noise. Wind noise is offensive to a person's ears.

SUMMARY

An advantage of some aspects of the invention is to provide a light source apparatus that emits suppressed wind noise. Another advantage of some aspects of the invention is to provide a projector including a light source apparatus of this type.

A first aspect of the invention provides a light source apparatus including a light source, a substrate provided rotatably around a predetermined axis of rotation, a scattered light generator which is provided on the substrate and on which light from the light source is incident, a pickup lens provided on a light exiting side of the scattered light generator, and a holding member that holds the pickup lens, and at least one of a contour of a surface closest to the substrate among surfaces of the holding member and a contour of a surface facing the substrate among surfaces of the pickup lens is located inside a contour of the substrate when viewed in a direction parallel to the axis of rotation.

In the light source apparatus according to the first aspect, since the amount of overlap between an object that enhances turbulence and a region where the turbulence occurs is smaller than in the related art, wind noise can be relatively reduced.

In the light source apparatus described above, it is preferable that the pickup lens protrudes relative to the holding member toward the substrate, and that the contour of the surface facing the substrate among surfaces of the pickup lens is located inside the contour of the substrate.

According to the configuration described above, the pickup lens, which can be disposed in the vicinity of the scattered light generator with noise suppressed, can efficiently capture light from the scattered light generator.

In the light source apparatus described above, it is preferable that the contour of the surface closest to the substrate among surfaces of the holding member is located inside the contour of the substrate.

According to the configuration described above, both the contour of the surface closest to the substrate among the surfaces of the holding member and the contour of the surface facing the substrate among surfaces of the pickup lens are located inside the contour of the substrate, whereby noise can be suppressed and a more silent apparatus can be provided.

In the light source apparatus described above, it is preferable that the scattered light generator is a phosphor layer that converts light incident from the light source into fluorescence and outputs the fluorescence. In this case, the phosphor layer is desirably made of an inorganic material.

According to the configuration described above, noise can be reduced in the light source apparatus including a rotating phosphor wheel. Further, since the phosphor layer made of an inorganic material can be disposed in a position close to the center of the rotating substrate, the pickup lens and the holding member can be disposed in a position close to the center of the substrate. The configuration of the aspect of the invention can therefore be readily and reliably achieved.

In the light source apparatus described above, the scattered light generator may be a diffusion layer that diffuses light incident from the light source.

According to the configuration described above, noise can be reduced in the light source apparatus including a rotating diffuser plate.

A second aspect of the invention provides a projector including the light source apparatus according to the first aspect described above, a light modulator that modulates light from the light source apparatus in accordance with image information to form image light, and a projection system that projects the image light.

The projector according to the second aspect includes a light source apparatus that emits suppressed noise, whereby a projector that emits suppressed noise can be achieved.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
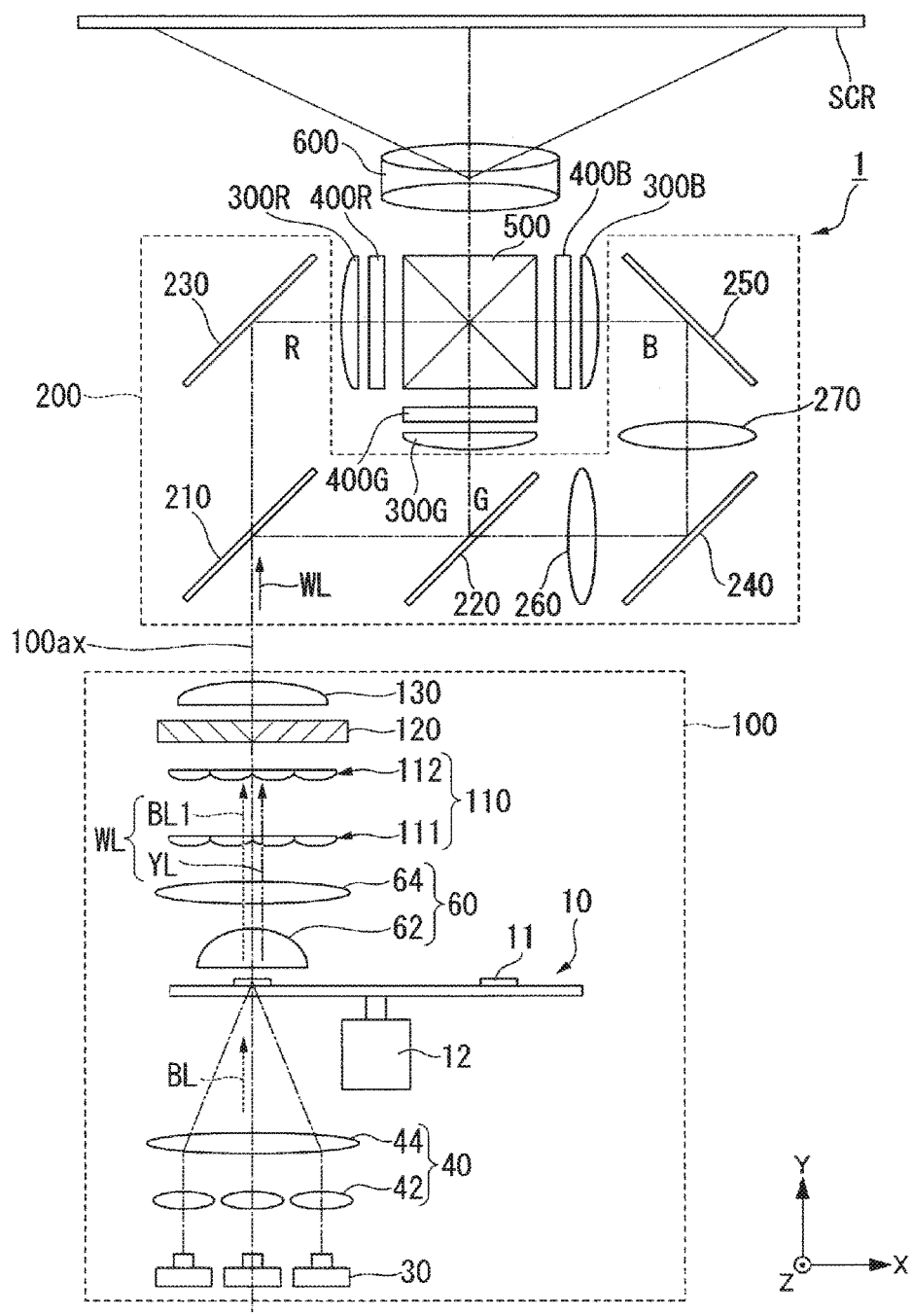
FIG. 1 is a diagrammatic view showing the optical system of a projector according to a first embodiment.

Embodiments of the invention will be described below in detail with reference to the drawings.

In the drawings used in the following description, a characteristic portion is enlarged for convenience in some cases for clarity of the characteristic thereof, and the dimension ratio and other factors of each component are therefore not always equal to actual values.

An XYZ orthogonal coordinate system is set in the following description using the drawings, and each member will be described with reference to the XYZ orthogonal coordinate system.

First Embodiment

FIG. 1 is a diagrammatic view showing the optical system of a projector 1 according to a first embodiment of the invention. In FIG. 1, reference character 100ax denotes an illumination optical axis.

The illumination optical axis is assumed to be the optical axis of light outputted from a light source apparatus 100 toward a color separation/guidance system 200. Further, the direction parallel to the illumination optical axis is assumed to be a Y axis.

The projector 1 includes a light source apparatus 100, a color separation/guidance system 200, a light modulator 400R, a light modulator 400G, and light modulator 400B, across dichroic prism 500, and a projection system 600, as shown in FIG. 1.

The light source apparatus 100 has a configuration in which light sources 30, which radiate excitation light, a light collection system 40, a phosphor wheel 10, a collimation system 60, an optical integration system 110, a polarization conversion element 120, and a superimposing lens 130 are arranged in this order.

Each of the light sources 30 emits blue light as excitation light BL, which excites a phosphor layer 11 provided on the phosphor wheel 10, which will be described later. The intensity of the light emitted from the light sources 30 peaks at about 445 nm.

The plurality of light sources 30 may be provided as in the present embodiment, but only one light source 30 may instead be used. Still instead, an excitation light source that emits color light the intensity of which peaks at a wavelength other than 445 nm and the wavelength of which allows excitation of the phosphor layer (scattered light generator) 11, which will be described later, may be used.

The light collection system 40 includes a plurality of first lenses 42 and a single second lens 44.

Each of the first lenses 42 and the second lens 44 is a convex lens. Light beams having passed through the first lenses 42 are incident on the second lens 44. The light collection system 40 is disposed across the axes of light beams that form the excitation light BL emitted from the light sources 30 and collects the excitation light BL emitted from the plurality of light sources 30.

The phosphor wheel 10 has a function of transmitting part of the blue excitation light BL emitted from the light sources 30 and converting the remaining excitation light BL into fluorescence. The phosphor wheel 10 has the phosphor layer 11, which absorbs the remaining excitation light BL and emits yellow fluorescence YL containing red light and green light. The intensity of the emitted fluorescence YL peaks at about 550 nm. The fluorescence YL and blue light BL1, which is part of excitation light BL, that is, the part having passed through the phosphor layer 11, are combined with each other to produce white illumination light WL.

The collimation system 60 includes a first lens 62, as an optical element that suppresses the degree of spread of the illumination light WL from the phosphor wheel 10, and a second lens 64, which roughly parallelizes light incident from the first lens 62. The first lens 62 is a pickup lens that captures the illumination light WL outputted from the phosphor wheel 10 and disposed in the vicinity of the phosphor wheel 10.

The collimation system 60 roughly parallelizes the illumination light WL outputted from the phosphor wheel 10 and causes the parallelized light to be incident on the optical integration system 110.

The optical integration system 110 includes a first lens array 111 and a second lens array 112. The first lens array 111 has a plurality of lenses arranged in a matrix. The second lens array 112 has a plurality of lenses corresponding to the plurality of lenses in the first lens array 111. The first lens array 111 divides the illumination light WL from the collimation system 60 into a plurality of divided light fluxes and focuses the divided light fluxes. The second lens array 112 converts the divided light fluxes from the first lens array 111 into light fluxes having an appropriate divergent angle and causes the divergent light fluxes to exit.

The polarization conversion element 120 has a PBS, a mirror, and a wave plate. The polarization conversion element 120 converts non-polarized light into light linearly polarized in one direction.

The superimposing lens 130 superimposes the plurality of divided light fluxes having exited out of the polarization conversion element 120 on one another on an illuminated area of each of the light modulators 400R, 400G, and 400B.

The color separation/guidance system 200 includes a dichroic mirror 210, a dichroic mirror 220, a reflection mirror 230, a reflection mirror 240, a reflection mirror 250, a relay lens 260, and a relay lens 270. The color separation/guidance system 200 separates the light from the light source apparatus 100 into red light, green light, and blue light and guides the color light fluxes or the red light, the green light, and the blue light to the light modulators 400R, 400G, and 400B, respectively, which are targets to be illuminated. Light collection lenses 300R, 300G, and 300B are disposed between the color separation/guidance system 200 and the light modulators 400R, 400G, 400B, respectively.

The dichroic mirror 210 transmits the red light component and reflects the green light component and the blue light component. The dichroic mirror 220, which receives the illumination light WL reflected off the dichroic mirror 210, reflects the green light component and transmits the blue light component.

The reflection mirror 230 reflects the red light component having passed through the dichroic mirror 210. The reflection mirror 240 and the reflection mirror 250 reflect the blue light component having passed through the dichroic mirror 220.

The red light having passed through the dichroic mirror 210 is reflected off the reflection mirror 230, passes through the light collection lens 300R, and is incident on an image formation area of the light modulator 400R for red light. The green light reflected off the dichroic mirror 210 is further reflected off the dichroic mirror 220, passes through the light collection lens 300G, and is incident on an image formation area of the light modulator 400G for green light. The blue light having passed through the dichroic mirror 220 travels via the relay lens 260, the reflection mirror 240, the relay lens 270, the reflection mirror 250, and the light collection lens 300B and is incident on an image formation area of the light modulator 400B for blue light.

Each of the light modulators 400R, 400G, and 400B modulates the corresponding color light incident thereon in accordance with image information to form an image. The light modulators 400R, 400G, and 400B are targets to be illuminated by the light source apparatus 100. Although not shown, light-incident-side polarizers are disposed between the light collection lenses 300R, 300G, 300B and the light modulators 400R, 400G, 400B. Further, light-exiting-side polarizers are disposed between the light modulators 400R, 400G, 400E and the cross dichroic prism 500.

For example, each of the light modulators 400R, 400G, and 400B is a transmissive liquid crystal panel having a liquid crystal material encapsulated and sealed between a pair of transparent substrates.

The cross dichroic prism 500 is, although not illustrated in detail, an optical element that combines optical images having been modulated on a color basis and having exited out of the light-exiting-side polarizers with one another to form a color image.

The color image having exited out of the cross dichroic prism (optical element) 500 is enlarged and projected by the projection system 600 and forms an image on a screen SCR.

The projection system 600 is formed of a plurality of lenses.

Figure 2A:
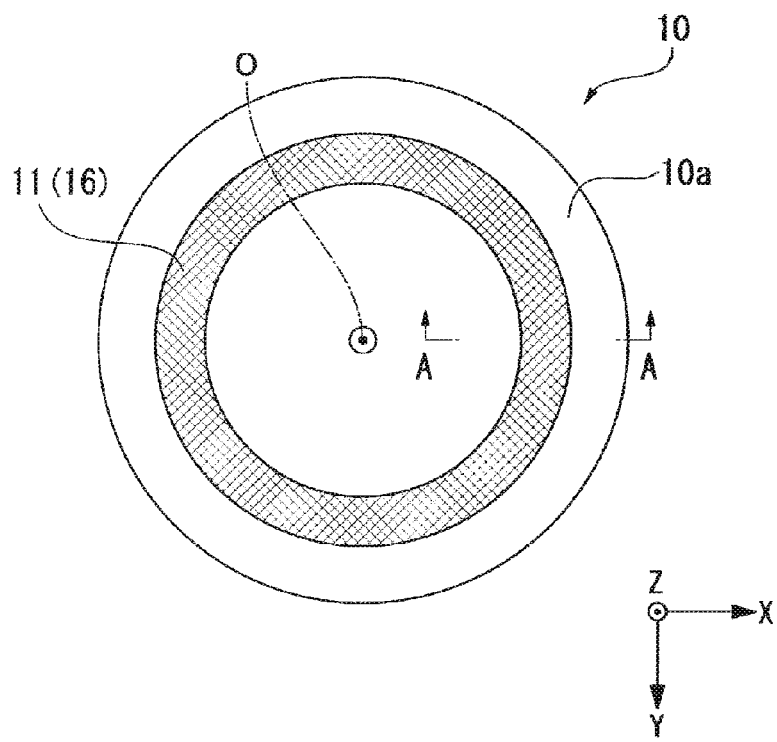
FIGS. 2A and 2B are configuration diagrams showing an example of a phosphor wheel.
Figure 2B:
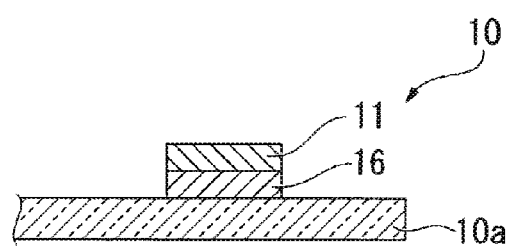

FIGS. 2A and 2B are configuration diagrams showing an example of the phosphor wheel 10. FIG. 2A is a plan view, and FIG. 2B is a cross-sectional view taken along the line A-A in FIG. 2A and viewed in the direction indicated by the arrows.

The phosphor wheel 10 is a transmissive rotating fluorescent plate. The phosphor wheel 10 has a disk-shaped rotating substrate (substrate) 10a, which is driven and rotated by a motor 12, a dielectric multilayer film 16, which is formed on one surface of the rotating substrate 10a along the circumferential direction (direction of rotation) thereof, and the phosphor layer 11, which has ring-like shape and is formed on the dielectric multilayer film 16, as shown in FIGS. 2A and 2B.

The rotating substrate 10a has an axis of rotation O, which extends in parallel to the thickness direction of the rotating substrate 10a (the direction of a normal to a principle surface of the rotating substrate 10a). When the motor 12 rotates the rotating substrate 10a, the position on the phosphor layer 11 where the excitation light BL is incident changes with time. The rotating substrate 10a does not necessarily have a disk-like shape.

The rotating substrate 10a is made of a material that transmits the excitation light BL. Examples of the material of the rotating substrate 10a may include quartz glass, crystalized quartz, sapphire, optical glass, and transparent resin. In the present embodiment, a disk-shaped glass substrate is used as the rotating substrate 10a.

In the present embodiment, the phosphor layer 11 contains a fluorescent substance (phosphor particles) that is made of an inorganic material and emits fluorescence, absorbs the excitation light BL (blue light), and converts the excitation light BL into the yellow fluorescence YL. The fluorescence YL is yellow light containing red light and green light.

The phosphor layer 11 can be made, for example, of yttrium-aluminum-garnet-based (YAG-based) phosphor, which can be made, for example, of YAG: Ce. In this case, the phosphor layer 11 can be formed, for example, of particles produced by mixture of several types of raw powder containing the constituent elements, such as $Y_2O_3$, $Al_2O_3$, and $CeO_3$, followed by a solid-phase reaction; Y—Al—O amorphous particles produced in a coprecipitation process, a sol-gel process, or any other wet process; YAG particles produced in a spray drying process, a flame thermal decomposition process, a thermal plasma process, or any other gas phase process.

In the present embodiment, the phosphor layer 11 can, for example, be manufactured in a procedure including steps described below.

Predetermined amounts of $Y_2O_3$, $Al_2O_3$, and $CeO_3$ are mixed with one another into a mixture material, an assistant material and a binder are added as required to the mixture material, and then the resultant material is further mixed with ethanol (mixture step). The ethanol mixture and zirconia balls are subsequently rotated and agitated (agitation step).

After the agitation, the ethanol is removed (drying step), the diameters of the phosphor particles are made uniform and the zirconia balls are removed (granulation step). The particles are then shaped into a disc-shaped block in a uniaxial press process or a cold isostatic pressing process (CIP) (formation step). The disc-shaped phosphor block is then baked at a predetermined temperature (sintering step). The baked phosphor block is then cut into a predetermined size (cutting step), and the surfaces of the cut block are polished to a predetermined thickness (polishing step).

The phosphor layer 11 in the present embodiment is thus manufactured on the basis of the steps described above. The phosphor layer 11 is then attached onto the dielectric multilayer film 16 formed on the rotating substrate 10a.

The dielectric multilayer film 16, which functions as a dichroic mirror, transmits the excitation light BL and reflects the fluorescence YL emitted from the phosphor layer 11.

Part of the excitation light BL incident on the phosphor layer 11 is absorbed by the fluorescent substance, which converts the excitation light BL into the fluorescence YL. The fluorescence YL exits out of the phosphor layer 11 directly or after reflected off the dielectric multilayer film 16. On the other hand, components of the excitation light BL that have not been absorbed by the phosphor particles (blue light BL1, which is a component of the excitation light BL) exit out of the phosphor layer 11.

The rotating substrate 10a rotates at a predetermined number of revolutions when the projector 1 is in operation. The rotation prevents the excitation light BL from being continuously incident on a specific area of the phosphor layer 11, whereby the life of the phosphor layer 11 is prolonged. The predetermined number of revolutions is a value that allows dissipation of heat generated in the phosphor layer 11 when it is irradiated with the excitation light BL. The predetermined number of revolutions is set on the basis of the intensity of the excitation light BL emitted from an array light source 30, the diameter of the rotating substrate 10a, the thermal conductivity of the rotating substrate 10a, and other data. The predetermined number of revolutions is further set in consideration, for example, of a safety factor. The predetermined number of revolutions is set at a sufficiently large value that prevents deterioration of the phosphor layer 11 and accumulation of thermal energy large enough to melt the rotating substrate 10a.

The phosphor wheel 10 undesirably produces wind noise, which annoys a person, when the rotating substrate 10a rotates.

Figure 3:
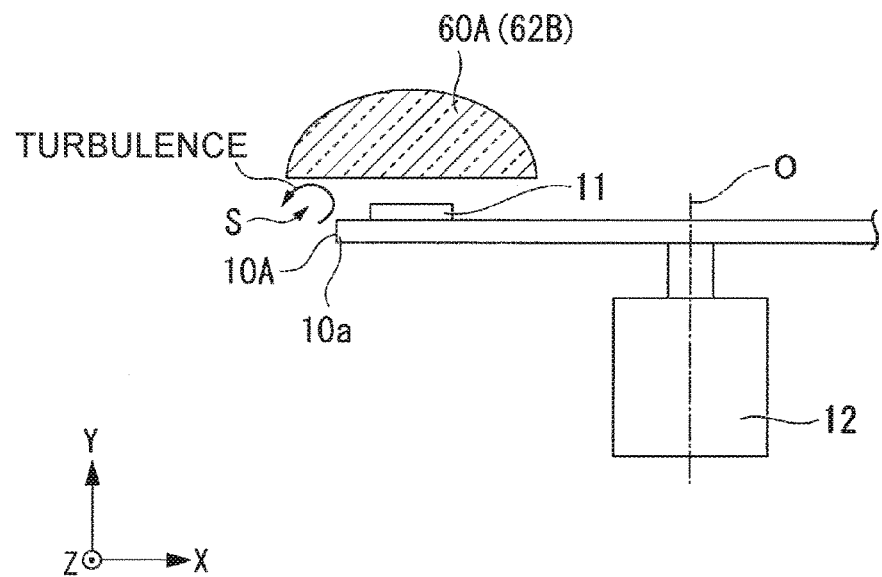
FIG. 3 describes a cause of noise.

The present inventor has conducted an intensive study and found that turbulence that occurs at the outer circumferential edge of the rotating substrate 10a produces wind noise and that a lens and other objects that enter a region S, where the turbulence occurs, enhance the turbulence, as shown in FIG. 3. The present inventor has attained the invention on the basis of the finding.

Figure 4:
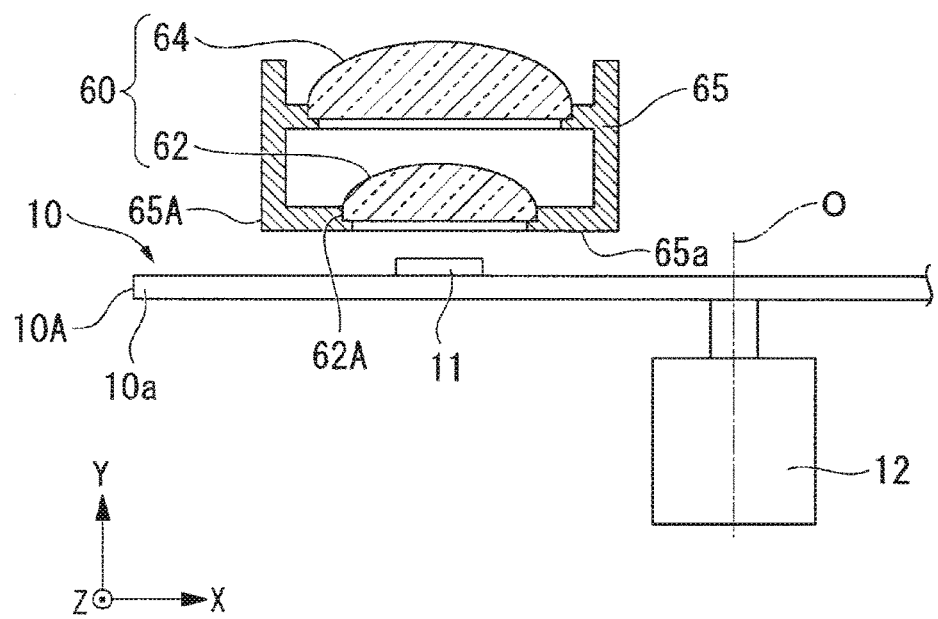
FIG. 4 shows the positional relationship between the phosphor wheel and a collimation system.

Specifically, the phosphor wheel 10 in the present embodiment employs a structure described below. FIG. 4 shows the positional relationship between the phosphor wheel 10 and the collimation system 60. In FIG. 4, the dielectric multilayer film 16 is not shown for simplified illustration.

In the present embodiment, the collimation system 60 includes a holding member 65 for holding the first lens 62 and the second lens 64, as shown in FIG. 4. The holding member 65 has two arms that hold outer circumferential edge portions of the first lens 62 and the second lens 64. The arms are positioned so as not to block the optical path of the light incident on the first lens 62 and the second lens 64.

The holding member 65 protrudes relative to the first lens 62 toward the rotating substrate 10a. The holding member 65 is therefore closer to the rotating substrate 10a than the first lens 62 in the direction parallel to the axis of rotation O. Among portions that form the holding member 65, a portion close the rotating substrate 10a corresponds to an object that enhances the turbulence.

The holding member 65 has a lower surface 65a, which is a surface closest to the rotating substrate 10a among the surfaces in the collimation system 60. A contour 65A of the lower surface 65a is located inside a contour 10A of the rotating substrate 10a when viewed in the direction parallel to the axis of rotation O. That is, the lower surface 65a of the holding member 65 is hidden behind the rotating substrate 10a and therefore invisible when the rotating substrate 10a is viewed from the lower surface side (−Y side).

In this configuration, since the amount of overlap between the object that enhances the turbulence and the region S where the turbulence occurs is smaller than in the related art, the noise produced when the rotating substrate 10a rotates is reduced. Further, since the projector 1 according to the present embodiment includes the light source apparatus 100, noise produced in the projector 1 is reduced.

To allow the holding member 65 and the rotating substrate 10a to satisfy the positional relationship described above, the following measures only need to be taken: The diameter of the phosphor layer 11 is reduced with the size of the rotating substrate 10a fixed; and the phosphor layer 11 is disposed in a position shifted toward the center of the rotating substrate.

The phosphor layer 11 in the present embodiment, which is made of an inorganic material, excels in heat resistance as compared with a phosphor layer of related art made of an organic material. Therefore, even when the phosphor layer 11 is disposed in a position shifted toward the center of the rotating substrate 10a, deterioration of the phosphor layer 11 due to heat and other problems do not occur.

On the other hand, when a phosphor layer made of an organic material is used and disposed in a position shifted toward the center of the rotating substrate as described above, not only does the amount of heat generated per unit area increase, but also the generated heat cannot be sufficiently dissipated, undesirably resulting in deterioration of the phosphor layer due to the heat.

To avoid the situation described above, it is conceivable to increase the size of the rotating fluorescent plate with the size of the phosphor layer maintained so that the phosphor layer is disposed in a position shifted toward the center of the rotating substrate in a relative sense. When the size of the rotating substrate is increased, however, noise produced by the rotation of the rotating substrate undesirably increases, and the invention cannot efficiently provide the advantageous effect thereof.

According to the present embodiment, employing the phosphor layer 11 made of an inorganic material as described above allows reliable achievement of the structure described above, in which the contour 65A of the lower surface 65a of the holding member 65 is located inside the contour 10A of the rotating substrate 10a with no deterioration of the phosphor layer 11 due to heat and no increase in the size of the rotating substrate 10a.

Second Embodiment

A second embodiment of the invention will subsequently be described. The present embodiment differs from the first embodiment in terms of the structure of the light source apparatus. Specifically, in the embodiment described above, the light source apparatus 100 including the phosphor wheel 10 including the phosphor layer 11 as the scattered light generator is described by way of example, and the present embodiment greatly differs from the embodiment described above in that a rotating diffuser plate including a diffusion layer that diffuses the excitation light is provided as the scattered light generator.

Figure 5:
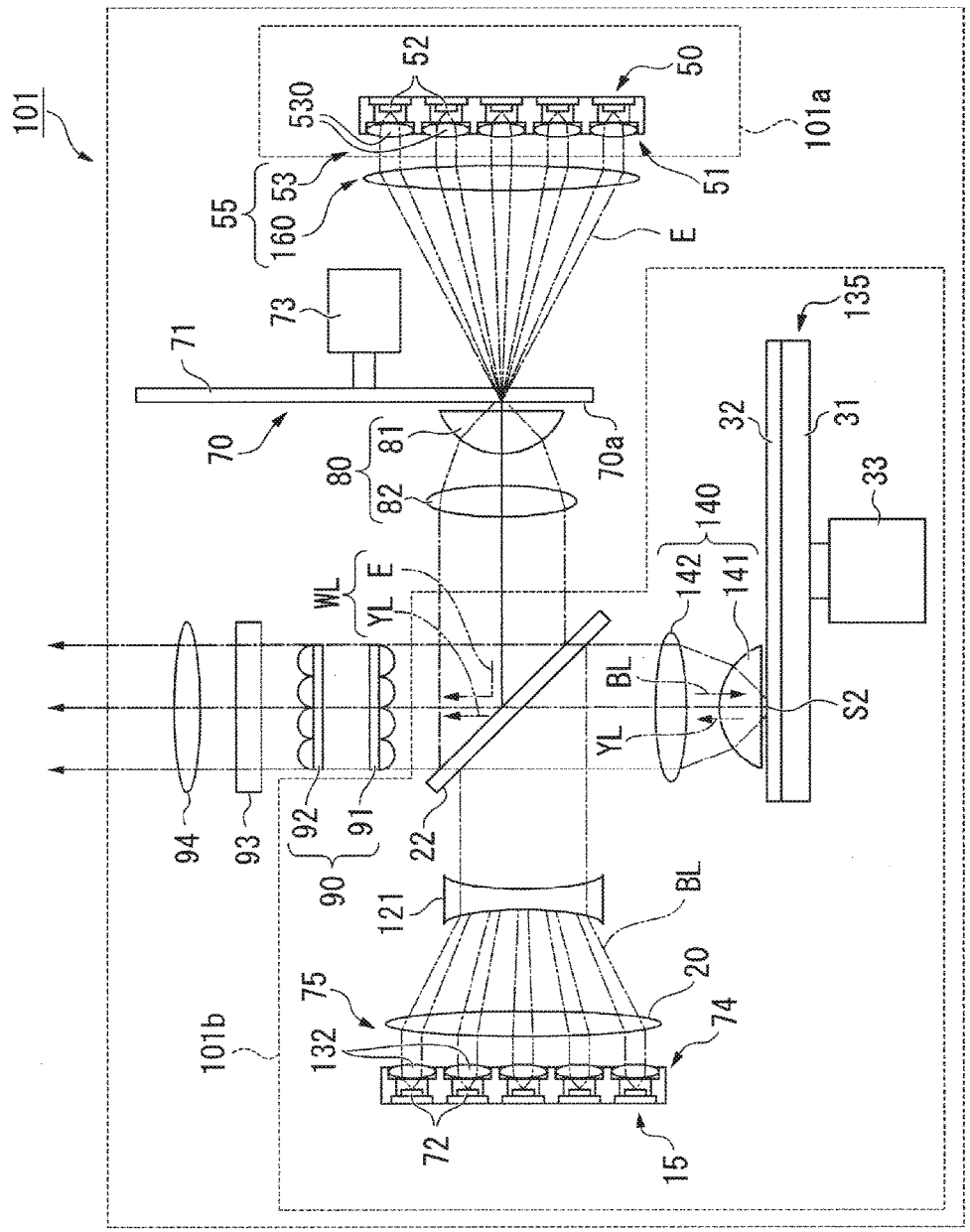
FIG. 5 shows the configuration of a light source apparatus in a second embodiment.

FIG. 5 shows the configuration of a light source apparatus in the present embodiment. A light source apparatus 101 in the present embodiment includes a first light source apparatus 101a, a first light collection lens 160, a rotating diffuser plate 70 as a diffusion member, a first pickup system 80, a second light source apparatus 101b, a fly's-eye optical integrator 90, a polarization conversion element 93, and a second parallelizing lens 94, as shown in FIG. 5.

The first light source apparatus 101a includes a first light source 50 and a first collimator array lens 53. As will be described later, the first light source apparatus 101a outputs, for example, laser light.

The second light source apparatus 101b includes a second light source 15, a second collimator lens array 132, a second light collection lens 20, a first parallelizing lens 121, a dichroic mirror 22, a second pickup system 140, a motor 33, and a wavelength conversion element 135. The second light source apparatus 101b outputs fluorescence.

The first light source 50 is a light source array including a first base 51 and a plurality of first solid-state light emitting devices 52 arranged on the first base 51. Each of the first solid-state light emitting devices 52 is a light source that emits blue light E that the dichroic mirror 22 can reflect. Each of the first solid-state light emitting devices 52 is a semiconductor laser that emits blue laser light (the intensity of the emitted light peaks at about 450 nm) in the present embodiment but may be any light source that emits light the intensity of which peaks at a wavelength other than 450 nm and the wavelength of which allows the light to be reflected off the dichroic mirror 22.

The first collimator lens array 53 has a plurality of first microlenses 530 corresponding to the first solid-state light emitting devices 52 in a one-to-one relationship. The plurality of first microlenses 530 are arranged on the first base 51. Each of the first microlenses 530 is disposed on the optical axis of the blue light emitted from the corresponding first solid-state light emitting device 52, parallelizes the blue light, and outputs the parallelized blue light. The first light source apparatus 101a thus outputs the blue light E formed of a plurality of laser beams.

The plurality of blue light beams E having exited out of the first collimator lens array 53, that is, the plurality of blue laser light beams outputted from the first light source apparatus 101a are focused by the first light collection lens 160, which is formed of a convex lens. The first collimator lens array 53 and the first light collection lens 160 form a first light collection system 55, which focuses the plurality of blue light beams emitted from the first light source 50. The first light source 50 corresponds to the light source in the appended claims.

The rotating diffuser plate 70 is a transmissive rotating diffuser plate that diffuses the blue light E incident thereon and outputs the diffused light through the surface opposite the light-incident-side surface. The rotating diffuser plate 70 includes a diffusion substrate 71 as a diffusion member driven and rotated by a motor 73. The diffusion substrate 71 is a substrate having a surface on which a light diffusing layer (scattered light generator) 71a is formed. The diffusion substrate 71 can, for example, be a known diffuser plate, such as a ground glass plate, a holographic diffuser, a transparent substrate having a blasted surface, and a transparent substrate having light scatterers, such as beads, diffused therein. In the present embodiment, the diffusion substrate 71 is formed of a circular plate but does not necessarily have a circular shape. The rotating diffuser plate 70 is so configured that when the diffusion substrate 71 is driven and rotated, the portion having been irradiated with the blue light E moves in a circular path relative to the region irradiated with the blue light E.

The light having exited out of the rotating diffuser plate 70 (diffused blue light E) is incident on the first pickup system 80. The first pickup system 80 is disposed on the optical path of the blue light E between the dichroic mirror 22 and the rotating diffuser plate 70.

Figure 6:
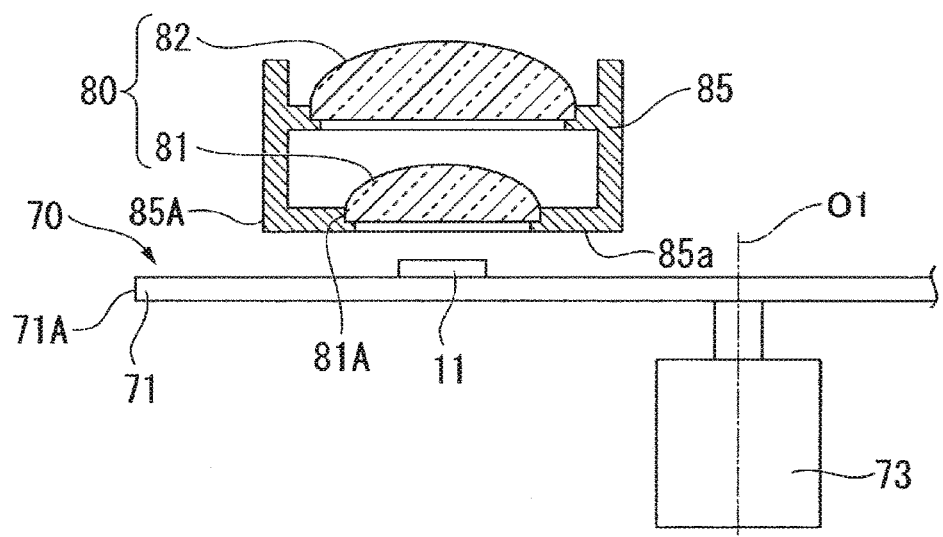
FIG. 6 shows the positional relationship between a rotating diffuser plate and a first pickup system.

FIG. 6 shows the positional relationship between the rotating diffuser plate 70 and the first pickup system 80.

The first pickup system 80 includes a first lens 81, which captures the blue light E from the rotating diffuser plate 70, a second lens 82, which parallelizes the blue light E having exited out of the first lens 81, and a holding member 85 for holding the first lens 81 and the second lens 82, as shown in FIG. 6. The first lens 81 is formed, for example, of a plano-convex lens having a flat light-incident surface and a convexly curved light-exiting surface. The second lens 82 is formed, for example, of a convex lens. The holding member 85 has two arms that hold outer circumferential edge portions of the first lens 81 and the second lens 82. The arms are positioned so as not to block the optical path of the light incident on the first lens 81 and the second lens 82.

The holding member 85 protrudes relative to the first lens 81 toward the diffusion substrate 71, as in the first embodiment. The holding member 85 is therefore closer to the diffusion substrate 71 than the first lens 81 in the direction parallel to an axis of rotation O1. Among portions that form the holding member 85, a portion close the diffusion substrate 71 corresponds to an object that enhances the turbulence.

The holding member 85 has a lower surface 85a, which is a surface closest to the diffusion substrate 71 among the surfaces in the first pickup system 80. A contour 85A of the lower surface 85a is located inside a contour 71A of the diffusion substrate 71 when viewed in the direction parallel to the axis of rotation O1. That is, the lower surface 85a of the holding member 85 is hidden behind the diffusion substrate 71 and therefore invisible when the diffusion substrate 71 is viewed from the side opposite the first pickup system 80.

On the basis of the configuration described above, the first pickup system 80 roughly parallelizes the blue light E from the rotating diffuser plate 70 and causes the parallelized blue light E to be incident on the dichroic mirror 22.

The dichroic mirror 22 is disposed on the optical path of the blue light E having exited out of the first pickup system 80. The light-incident-side surface of the dichroic mirror 22 on which the blue light E having exited out of the first pickup system 80 is incident is inclined to the direction of the optical path by about 45° and faces the fly's-eye optical integrator 90. The dichroic mirror 22 deflects the blue light E incident from the first pickup system 80 by 90° and reflects the blue light E toward the fly's-eye optical integrator 90.

The second light source 15 includes a second base 74 and a plurality of second solid-state light emitting devices 72 arranged on the second base 74.

Each of the second solid-state light emitting devices 72 emits excitation light BL, which excites a wavelength conversion layer 32 provided on the wavelength conversion element 135, which will be described later. Each of the second solid-state light emitting devices 72 is an LED that emits blue excitation light BL (the intensity of the emitted light peaks at about 450 nm) as excitation light in the present embodiment but may be any light source that emits light the intensity of which peaks at a wavelength other than 450 nm and the wavelength of which allows excitation of the wavelength conversion layer 32.

The second collimator lens array 75 has a plurality of second microlenses 131 corresponding to the second solid-state light emitting devices 72 in a one-to-one relationship. The plurality of second microlenses 131 are arranged on the second base 74. Each of the second microlenses 131 is disposed on the optical axis of the excitation light BL emitted from the corresponding second solid-state light emitting device 72 and parallelizes the excitation light BL. The excitation light BL having exited out of the second collimator lens array 75 is collected by the second light collection lens 20, which is formed of a convex lens.

The first parallelizing lens 121, which is formed of a biconcave lens, is disposed on the optical path of the excitation light BL between the second light collection lens 20 and the dichroic mirror 22. The first parallelizing lens 121 is disposed between the second light collection lens 20 and the focal position thereof, parallelizes the excitation light BL incident from the second light collection lens 20, and outputs the parallelized excitation light BL to the dichroic mirror 22.

The dichroic mirror 22 is disposed on the optical path of the light having exited out of the first parallelizing lens 121. The light-incident-side surface of the dichroic mirror 22 on which the light having exited out of the first parallelizing lens 121 is incident is inclined to the direction of the optical path of the light having exited out of the first parallelizing lens 121 by about 45° and faces the second pickup system 140. The dichroic mirror 22 not only deflects the excitation light BL incident from the first parallelizing lens 121, that is, the blue light by 90° and reflects the blue light toward the second pickup system 140 but also transmits fluorescence YL incident from the second pickup system 140.

The second pickup system 140 roughly parallelizes the fluorescence YL from the wavelength conversion element 135 and causes the parallelized fluorescence YL to be incident on the dichroic mirror 22. A first lens 141 and a second lens 142 of the second pickup system 140 also have a function of focusing the excitation light BL incident from the dichroic mirror 22, that is, cause the focused excitation light BL to be incident on the wavelength conversion element 135.

In the second pickup system 140, the refractive index and shape of each of the lenses that form the second pickup system 140 are determined in accordance with the degree of spread of the fluorescence YL emitted from the wavelength conversion element 135, and the number of lenses that form the second pickup system 140 is not limited to two and can be one or three or more.

The wavelength conversion element 135 is a reflective wavelength conversion element, that is, the fluorescence YL is emitted through the side of the wavelength conversion element 135 on which the excitation light BL is incident. The wavelength conversion element 135 includes a circular plate 31, a wavelength conversion layer 32, and a reflection layer 34.

The circular plate 31 is preferably made of aluminum or any other metal material having high thermal conductivity. The thus formed circular plate 31 can function as a heat dissipating plate. The phosphor layer 32 is provided on the upper surface of the circular plate 31 or the surface thereof facing the second pickup system 140.

The excitation light BL focused by the first lens 141 and the second lens 142 is incident on the wavelength conversion element 135 through the phosphor layer 32, specifically, the surface thereof opposite the reflection layer 34. In the wavelength conversion element 135, the phosphor layer 32 emits the fluorescence YL toward the side on which the excitation light BL is incident.

The light emitted from the wavelength conversion element 135 is parallelized by the second pickup system 140 and incident on the dichroic mirror 22. The dichroic mirror 22, which receives the light incident from the second pickup system 140, reflects and removes the blue light and transmits only the yellow fluorescence YL containing green light and red light. The second light source apparatus 101b thus outputs the yellow fluorescence YL.

Further, the blue light emitted from the first light source 50 is incident on the dichroic mirror 22 and reflected off the dichroic mirror 22 in the direction parallel to the optical axis of the light having exited out of the second pickup system 140. As a result, the green light and the red light having exited out of the second pickup system 140 and the blue light having exited out of the first pickup system 80 are combined with each other into white light.

The green light, the red light, and the blue light combined with one another by the dichroic mirror 22 are incident on the fly's-eye optical integrator 90, which is formed of a first fly's-eye lens array 91 and a second fly's-eye lens array 92. The green light, the red light, and the blue light having exited out of the fly's-eye optical integrator 90 are converted by the polarization conversion element 93 into light fluxes linearly polarized in one direction, parallelized by the second parallelizing lens 94, and caused to exit out of the light source apparatus 101.

In this configuration, the amount of overlap between the object that enhances the turbulence and the region S where the turbulence occurs is smaller than in the related art, the noise produced when the rotating diffuser plate 70 rotates is reduced.

The invention is not necessarily limited to the embodiments described above, and a variety of changes can be made thereto to the extent that the changes do not depart from the substance of the invention.

Figure 7:
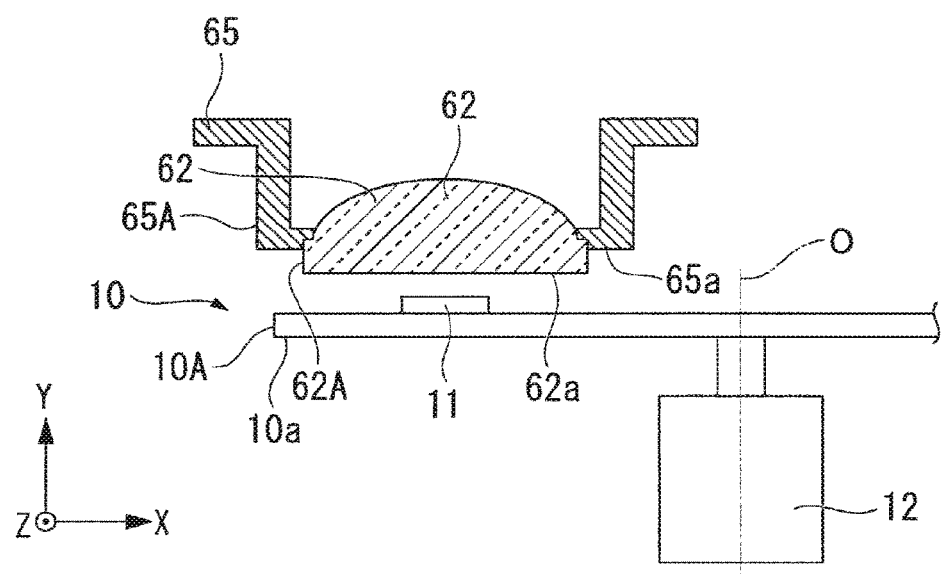
FIG. 7 shows a configuration according to a variation.

Further, in the first embodiment described above, the case where the holding member 65 is disposed in a position closer to the rotating substrate 10a than the first lens 62 in the direction parallel to the axis of rotation O of the rotating substrate 10a is presented by way of example, but the invention is not limited to the case. For example, the first lens 62 may instead be disposed in a position closer to the rotating substrate 10a than the holding member 65, as shown in FIG. 7. In this case, the first lens 62, which is disposed in a position closer to the rotating substrate 10a, can efficiently capture the light from the phosphor layer 11.

In the aspect shown in FIG. 7, the first lens 62 has a lower surface 62a, which is a surface closest to the rotating substrate 10a among the surfaces in the collimation system. An object that most enhances the turbulence is, among portions of the first lens 62, a portion that protrudes from the holding member 65. A contour 62A of the lower surface 62a is at least located inside the contour 10A of the rotating substrate 10a when viewed in the direction parallel to the axis of rotation O. In this configuration, the amount of overlap between the first lens 62, which is located in a position closest to the rotating substrate 10a, and the region S where the turbulence occurs is smaller than in the related art, the noise produced when the rotating substrate 10a rotates is reduced.

The holding member 65 is disposed outside the contour 62A. The distance between the holding member 65 and the rotating substrate 10a is, however, greater than the distance between the first lens 62 and the rotating substrate 10a. Therefore, the amount of overlap between the collimation system 60 and the region S where the turbulence occurs is smaller than in the related art, the noise produced when the rotating substrate 10a rotates is reduced.

Further, in the aspect shown in FIG. 7, the contour 65A of the holding member 65 may be located inside the contour 10A of the rotating substrate 10a. In this configuration, the amount of overlap between the collimation system 60 and the region S where the turbulence occurs is further reduced, the noise can be further reduced.

Figure 8:
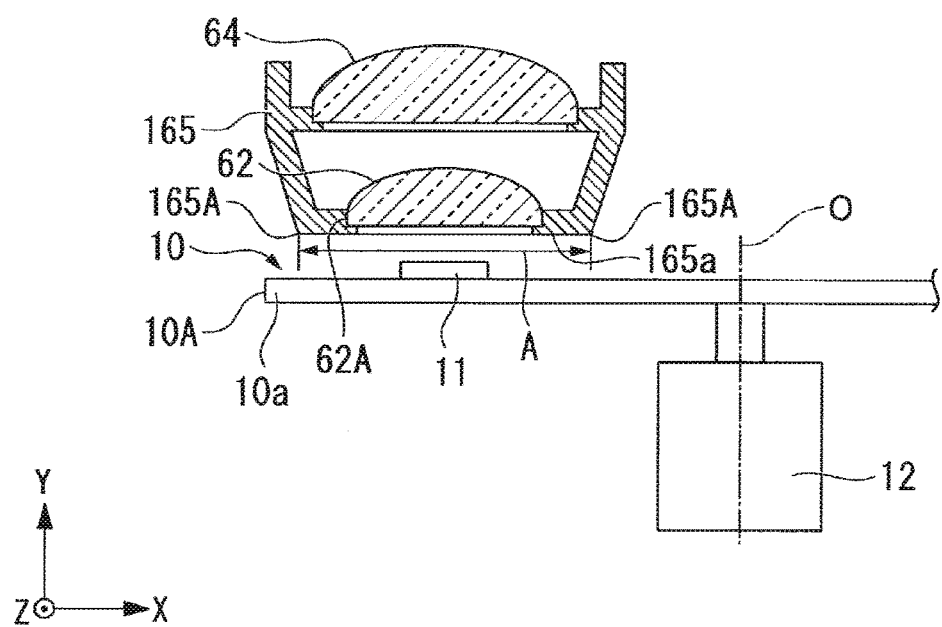
FIG. 8 shows a configuration according to another variation.

Further, in the first embodiment described above, the case where the lower surface 65a of the holding member 65 is a flat surface is presented by way of example, but the shape of the holding member 65 is not limited to a flat surface. For example, a holding member 165 may be so shaped that part (end portion) of a lower surface 165a of the holding member 165 is bent obliquely upward, as shown in FIG. 8. In this case, a contour 165A of the lower surface 165a is defined by the portion closest to the rotating substrate 10a among the portions of the lower surface 165a, that is, the portion excluding the bent portion (region indicated by the arrow A in FIG. 8).

The invention may further be applied to the reflective wavelength conversion element 135 (circular plate 31) and the second pickup system 140.

Further, in the embodiments described above, the projector 1 including the three light modulators 400R, 400G, and 400B is presented by way of example, and the invention is also applicable to a projector that displays color video images with a single liquid crystal light modulator. Moreover, a digital mirror device may be used as each of the light modulators.

Further, in the embodiments described above, the case where the light source apparatus according to any of the embodiments of the invention is incorporated in a projector is presented by way of example, but the invention is not limited to the case. The light source apparatus according to any of the embodiments of the invention can also be used, for example, as a lighting apparatus and an automobile headlight. The entire disclosure of Japanese Patent Application No. 2015-028781, filed on Feb. 17, 2015 is expressly incorporated by reference herein.

What is claimed is:

1. A light source apparatus comprising:
   a light source;
   a substrate provided rotatably around a predetermined axis of rotation;
   a scattered light generator which is provided on the substrate and on which light from the light source is incident;
   a pickup lens provided on a light exiting side of the scattered light generator; and
   a holding member that holds the pickup lens,
   wherein an entire contour of a surface of the holding member that is closest to the substrate is inside a contour of the substrate when viewed in a direction parallel to the axis of rotation, and wherein the surface of the holding member that is closest to the substrate is closer to the substrate than a surface of the pickup lens facing the substrate is to the substrate.

2. The light source apparatus according to claim 1, wherein the contour of the surface facing the substrate among surfaces of the pickup lens is located inside the contour of the substrate.

3. The light source apparatus according to claim 1, wherein the scattered light generator is a phosphor layer that converts light incident from the light source into fluorescence and outputs the fluorescence.

4. The light source apparatus according to claim 3, wherein the phosphor layer is made of an inorganic material.

5. The light source apparatus according to claim 1, wherein the scattered light generator is a diffusion layer that diffuses light incident from the light source.

6. A projector comprising:
the light source apparatus according to claim 1;
a light modulator that modulates light from the light source apparatus in accordance with image information to form image light; and
a projection system that projects the image light.

7. A projector comprising:
the light source apparatus according to claim 2;
a light modulator that modulates light from the light source apparatus in accordance with image information to form image light; and
a projection system that projects the image light.

8. A projector comprising:
the light source apparatus according to claim 3;
a light modulator that modulates light from the light source apparatus in accordance with image information to form image light; and
a projection system that projects the image light.

9. A projector comprising:
the light source apparatus according to claim 4;
a light modulator that modulates light from the light source apparatus in accordance with image information to form image light; and
a projection system that projects the image light.

10. A projector comprising:
the light source apparatus according to claim 5;
a light modulator that modulates light from the light source apparatus in accordance with image information to form image light; and
a projection system that projects the image light.

* * * * *